United States Patent [19]

Ono et al.

[11] Patent Number: 5,042,047

[45] Date of Patent: Aug. 20, 1991

[54] LASER APPARATUS

[75] Inventors: Takuhiro Ono, Zama; Naoya Horiuchi, Kawasaki; Takashi Iwabuchi, Sagamihara; Takeo Miyata, Zama; Reiji Sano, Kawasaki, all of Japan

[73] Assignee: Matsushita Electric Industrial Co., Ltd., Kadoma, Japan

[21] Appl. No.: 169,784

[22] Filed: Mar. 18, 1988

[30] Foreign Application Priority Data

Mar. 19, 1987 [JP] Japan .................................. 62-64580
Mar. 19, 1987 [JP] Japan .................................. 62-64581

[51] Int. Cl.⁵ ............................................ H01S 3/097
[52] U.S. Cl. ........................................ 372/86; 372/87; 372/88; 372/92; 372/93; 372/100; 372/108
[58] Field of Search ................................ 372/86-88, 372/92, 93, 100, 108

[56] References Cited

U.S. PATENT DOCUMENTS

| | | | |
|---|---|---|---|
| 3,500,240 | 3/1970 | Kessler | 372/108 |
| 3,581,229 | 5/1971 | Martin | 372/93 |
| 4,417,342 | 11/1983 | McKee | 372/87 |
| 4,423,510 | 12/1983 | Pack et al. | 372/87 |
| 4,468,778 | 8/1984 | Karning et al. | 372/108 |
| 4,703,490 | 10/1987 | Brumme et al. | 372/86 |

FOREIGN PATENT DOCUMENTS

| | | |
|---|---|---|
| 0152570 | 8/1985 | European Pat. Off. |
| 0178621 | 4/1986 | European Pat. Off. |
| 3403841 | 8/1985 | Fed. Rep. of Germany ........ 372/87 |
| 2144141 | 2/1973 | France |
| 2035674 | 6/1980 | United Kingdom |

OTHER PUBLICATIONS

Patent Abstracts of Japan, vol. 6, No. 9 (E-90) [887], 20 Jan. 1982; & JP-A-56 131 985 (Mitsubishi Denki K.K.).

Primary Examiner—William L. Sikes
Assistant Examiner—Georgia Y. Epps
Attorney, Agent, or Firm—Cushman, Darby & Cushman

[57] ABSTRACT

A laser beam generated between a total reflector and an output coupler is turned back by plural reflectors which are mounted in a discharge region along two main electrodes at 45°, and the discharge region is divided into plural divided discharge regions, thus, a diameter of an output laser beam is reduced to a diameter of the divided discharge regions.

15 Claims, 7 Drawing Sheets

LASER APPARATUS

FIELD OF THE INVENTION AND RELATED ART STATEMENT

1. Field of the Invention

The present invention relates generally to a laser apparatus, and more particularly to a laser apparatus which has an effective utilization of a laser beam generated in a discharge chamber and is operable in low atmospheric pressure laser medium.

2. Description of the Related Art

An excimer laser generates a laser light having high power and high repeat frequency in ultraviolet range by discharge excitation of a rare gas and a halogen gas. The laser apparatus is expected to be applied to various technical research and further to a semiconductor fabricating process, chemical industry, pharmaceutical industry and energy generating field.

Typical excimer lasers are that of ArF of 193 nm wavelength, KrF of 248 nm wavelength and XeCl of 308 nm wavelength, and the laser light is generated by discharge excitation of a laser medium of a mixture of a rare gas and a halogen gas enclosed in a discharge chamber.

FIG. 1(a) is a cross-sectional view on a sectional plane perpendicular to an optical axis 7 of a main portion of an excimer laser apparatus in the prior art. A known power source and other known electronic circuits for operating the excimer laser apparatus are omitted for simplicities in FIG. 1(a). Referring to FIG. 1(a), the discharge chamber 2 is filled with a laser medium. Two main electrodes 3 and 4 which are long in a direction of the optical axis 7 and face each other are provided in the discharge chamber 2. The main electrodes 3 and 4 are wired to the power source through a capacitor (not shown). Ultraviolet light is radiated from pre-discharge means 5 prior to application of a high voltage pulse across the main electrodes 3 and 4, and the laser medium between the main electrodes 3 and 4 is ionized. When a voltage of the high voltage pulse which is applied across the main electrodes 3 and 4 reaches a break down voltage of the laser medium, glow discharge 6 is generated between the main electrodes 3 and 4, and the laser medium is excited. Consequently, laser light is emitted between an output coupler 10 which is mounted perpendicularly to the optical axis 7 and a total reflector (not shown).

It is well known that the higher the atmospheric pressure of the laser medium which is filled in the discharge chamber the higher the laser output energy per pulse becomes. The atmospheric pressure of the laser medium is generally 2–4 Kg/cm$^2$.

On the other hand, an optimum interval H of the main electrodes 3 and 4 (height of discharge region) depends on the atmospheric pressure of the laser medium, and is experimentally represented by the following relation:

$$H(\text{interval}) \times P(\text{atmospheric pressure}) = 6 \text{ Kg/cm}.$$

Therefore, the higher the atmospheric pressure is, the narrower the interval H of the electrodes 3 and 4 becomes. Therefore, it is recommendable that a wide interval of the electrodes is employed in case of low atmospheric pressure of the laser medium. In either the chemical industry or the energy generating field, increase of the output energy of the laser per pulse is required, thus operation in high atmospheric pressure of the laser medium which is over 3 Kg/cm$^2$ is feasible. A cross section of the output laser beam in the above mentioned example is generally 20 mm in height and 15 mm in width.

Increase of an average output by mean of increase of a repeat frequency of the laser oscillation is required rather than a higher output per pulse for a light source of photolithography in the semiconductor fabricating process, in which the high output per pulse is not required for exposing process of a photosensitive material such as photoresist. In a material of polymetamethyl alkylate (acrylate), for example, if a laser light having over 300 mJ/cm$^2$ per pulse is applied, a troublesome "ablation" arises. Therefore, a plurality of exposures by a low output light are preferable. A repeat frequency of at least 200 Hz is required for the light source of photolithography.

In order to realize the laser oscillation of the high repeat frequency, a flow rate of the laser medium passing between the two main electrodes must be increased. For example, when a width of the discharge region of the main electrodes is designated by "W"(m) as shown in FIG. 1(a) and the repeat frequency is designated by N(1/sec), a requisite flow rate U(m/sec) of the laser medium, in order that the laser medium existing in the discharge region after main discharge is perfectly replaced by new laser medium before the next main discharge, is defined by the following equation:

$$U = C_R \cdot W \cdot N.$$

The value of $C_R$ is 1 in an ideal condition, but the value of $C_R$ is valid by a structure of the discharge chamber and the shape of the electrodes, and is generally 2–3. For example, in a laser apparatus having a width W of 0.02 m, a repeat frequency N of 500/sec and a value $C_R$ of 2, a flow rate of the laser medium of 20 m/sec is required.

In order to realize the above mentioned flow rate in the laser apparatus which is operated in a high atmospheric pressure laser medium, a fan which is driven by a high power electric motor must be provided in the discharge chamber because of the high atmospheric pressure of the laser medium, and further strong-build holding members and bearings for the fan are required. Consequently a complex mechanism is required and the cost thereof is expensive.

Therefore, in order to realize high repeat frequency oscillation, a laser apparatus which is operated in low atmospheric pressure is advantageous. However, the wide interval of the two main electrodes, as mentioned above, is required in order to realize oscillation having high efficiency especially in the excimer laser which is operated in the low atmospheric pressure laser medium.

Thus, as shown in FIG. 1(b), a ratio of beam width (W'), which is almost equal to the width of the discharge region W, to the beam height (H'), which is almost equal to the interval of the electrodes 3 and 4 of the cross section of the output laser beam of the excimer laser, increases. In an operation of low atmospheric pressure of 2 Kg/cm$^2$, an adequate interval H of the electrodes is about 3 cm, and a cross section of the excimer laser radiated from the laser apparatus is rectangle of about 3 cm in height (H') and about 1.5 cm in width (W'), and the ratio H'/W' becomes about 2. When the atmospheric pressure of the laser medium is lower than the above mentioned case, the ratio H'/W' of the laser beam farther increases. The large ratio H'/W' is not preferable for application of the excimer laser. For example, in application of the semiconductor fabricating process using photolithography, an expensive optical system of large diameter is required to utilize the output of the laser light effectively. On the other hand, in case an optical system which is smaller than the beam height (H') in an effective diameter is employed, the output beam of the laser is shielded by an aperture which is almost equal to the effective diameter the optical system. And thereby, effective utilization of the output beam cannot be attained.

As mentioned above, in the prior art, cross-sectional shape of the laser beam which is output from the apparatus is equal to the shape of the discharge region 6, which is shown by the beam width (W') and beam height (H'). Consequently, there is a defect that the ratio H'/W' in low atmospheric pressure operation increases.

The defect commonly exists not only in the excimer laser but also in gas lasers such as $CO_2$ (Carbon Dioxide) lasers or He-Ne (Helium-Neon) lasers.

OBJECT AND SUMMARY OF THE INVENTION

An object of the present invention is to provide a laser apparatus which is operated in a low atmospheric pressure of a laser medium and effective utilization of an oscillated laser beam by a simple structure of the apparatus attainable.

The laser apparatus in accordance with the present invention comprises:

a discharge chamber enclosing a laser medium therein, at least two main electrodes, provided in said discharge chamber facing each other with main optical axis therebetween, holding a predetertmined gap therebetween, to define a discharge region therein, pre-discharge means for preliminary excitation of said laser medium prior to initiation of main discharge across said main electrodes, a total reflector which is provided at one end of said discharge chamber with its reflection plane perpendicular to said main optical axis for reflecting laser light beam by 180°, output coupler means provided at vicinity of said total reflector at said one end of said discharge chamber to allow laser light to go out therethrough, and at least one light folding means provided at least on the other end of said discharge chamber for folding laser light beam incident thereto in a manner to travel on a path which is parallel to path of said incident laser light beam, thereby to constitute folded lasing path which consists of plural parallel, lasing regions having respective optical axes in parallel and connected by said light folding means at their ends.

DESCRIPTION OF THE PREFERRED EMBODIMENTS

Figure 1A:
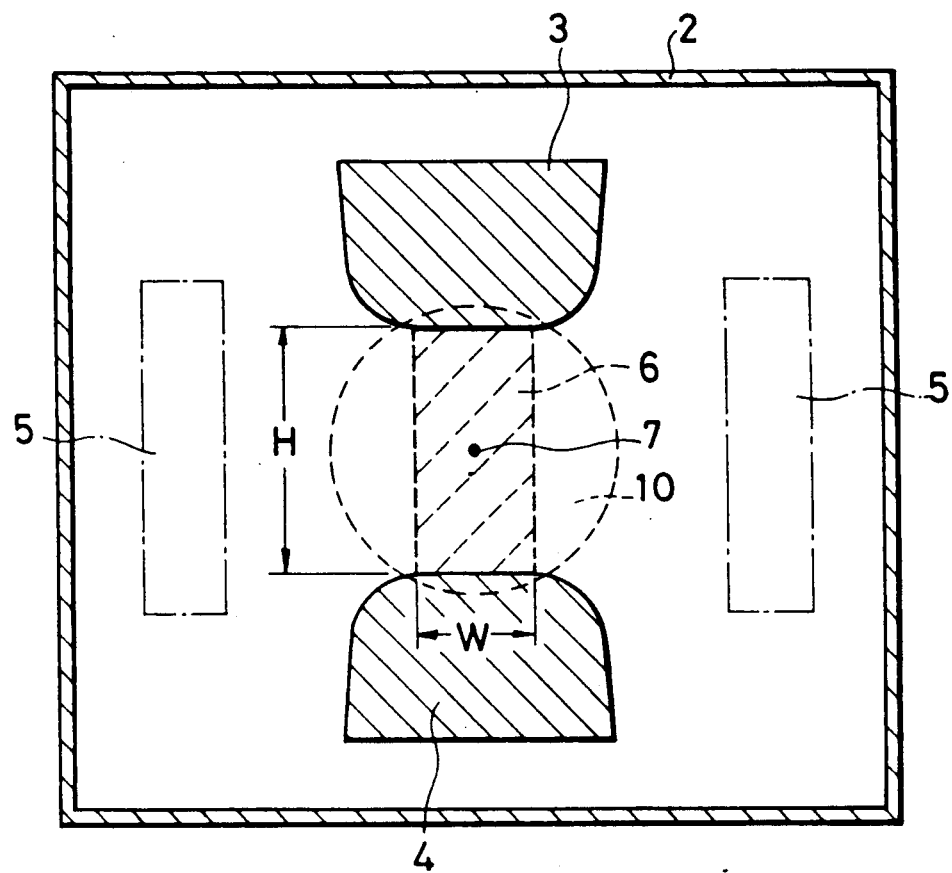
FIG. 1(a) is the cross-sectional view of the laser apparatus in the prior art.
Figure 1B:
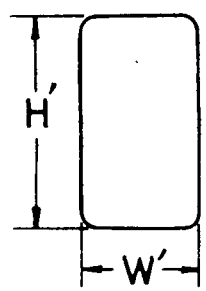
FIG. 1(b) is the cross-sectional view of the laser beam generated by the laser apparatus in the prior art.
Figure 2A:
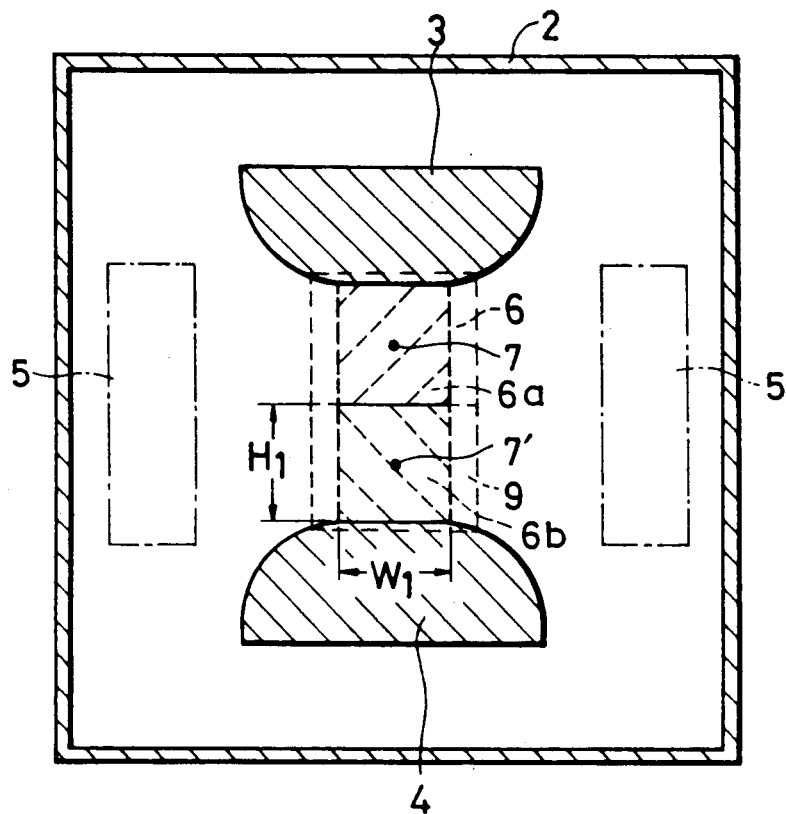
FIG. 2(a) is a cross-sectional view which is perpendicular to an optical axis of a laser apparatus of a first embodiment in accordance with the present invention.
Figure 2B:
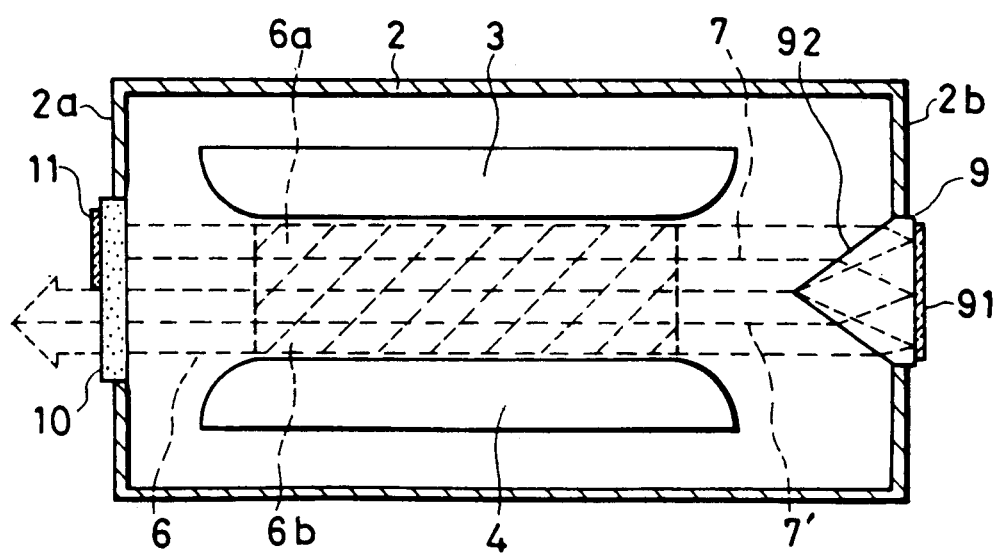
FIG. 2(b) is a cross-sectional view along the optical axis of the laser apparatus of the first embodiment.
Figure 3:
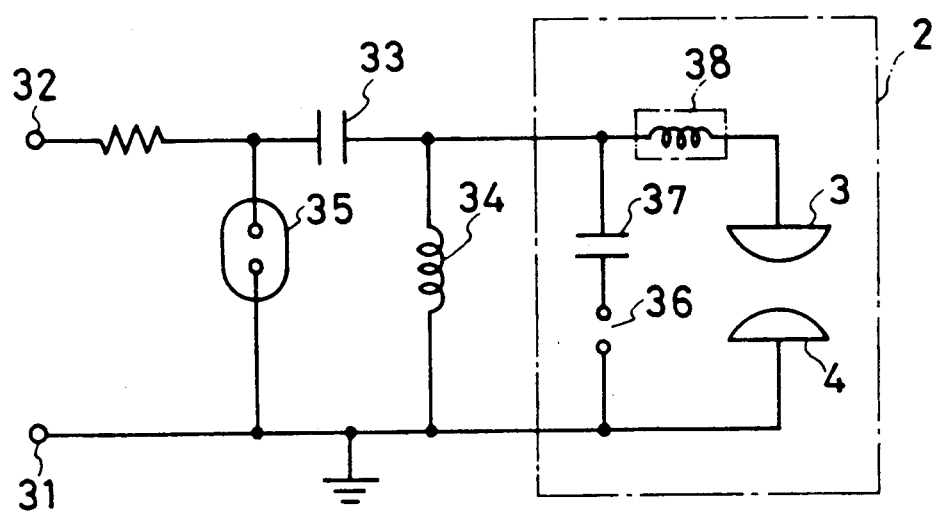
FIG. 3 is an exciting circuit for operating the laser apparatus in the first embodiment.

FIG. 2(a) is a cross-sectional view on a plane perpendicular to opticals axes 7 and 7' of an excimer laser apparatus of a first embodiment in accordance with the present invention, and FIG. (2b) is a cross-sectional view along the optical axes 7 and 7' of the first embodiment. Referring to FIG. 2(a) and FIG. 2(b), a discharge chamber 2 is filled with a laser medium gas which is a mixture of a rare gas and a halogen gas at a predetermined atmospheric pressure under 3 $Kg/cm^2$ (2280 torr.). The laser medium is circulated with a flow rate of 20-30 m/sec in a direction perpendicular to the optical axes 7 and 7' in a discharge region 6 defined between main electrodes 3 and 4. The main electrodes 3 and 4 are made to be a cross section of generally known Logosky or Chang type so that a uniform glow discharge is attainable. The main electrodes 3 and 4, as shown in FIG. 3, are coupled to an exciting circuit of high voltage resonant charge transfer type. The uniform glow discharge is generated in the gap between the main electrodes 3 and 4 with a short time period by a charge and discharge energy of a peaking capacitor 37, and the discharge region 6 for generating the laser beam is formed. In FIG. 3, a spark gap 36, a peaking capacitor 37 and the main electrodes 3 and 4 are mounted in the discharge chamber 2.

In the exiting circuit as shown in FIG. 3, a high voltage from a high voltage power source (not shown) is applied across terminals 31 and 32, and a storage capacitor 33 is charged through a charge coil 34. The electric charge in the storage capacitor 33 is transferred to a peaking capacitor 37 by closing a switch 35 such as spark gap or thyratron switch through the spark gap 36.

Then, discharge occurs between the spark gap 36 during charge of the peaking capacitor 37. The laser medium in the spark gap 36 is ionized by the discharge, and ultraviolet light is emitted. The laser medium between the main electrodes 3 and 4 which are irradiated by the ultraviolet light is ionized. The ionization is called "pre-ionization". When the voltage which is applied across both the terminals of the peaking capacitor 37 reaches a break down voltage, a main discharge is generated across the main electrodes 3 and 4, and laser light is emitted.

In order to increase the output of the laser beam and improve a transfer efficiency to the laser light in the excitation operation, a large electric power must be input in a closed loop which is composed of the peaking capacitor 37, the spark gap 36, the main electrodes 3 and 4 and the stray inductance 38 during a short time period (several 10 nsec in excimer laser). In order to attain the purpose of reducing the size, the respective elements included in the closed loop must be miniaturized, and the stray inductance 38 due to wiring between the respective elements must be reduced to the minimum.

In FIG. 2(a) and FIG. 2(b), the pre-ionizing devices 5 composed of the spark gap 36 and the peaking capacitor 37 ionize the laser medium prior to the main discharge of the discharge region 6, and make a function for uniforming the glow discharge between the main electrodes 3 and 4. In the discharge operation, when the high voltage pulse is applied to the main electrodes 3 and 4, ultraviolet light is automatically radiated by the pre-ionizing devices 5.

The discharge region 6 has a height H equal to the interval between the main electrodes 3 and 4 and a width W determined by the width of the main electrodes 3 and 4. The height H of the discharge region 6 depends on the pressure of the laser gas medium and is experimentally represented by the relation:

$$H.P = 6 \text{ Kg/cm}^2$$

as previously described. When the pressure of the laser gas medium is less than or equal to 3 Kg/cm$^2$, the height H of the discharge region 6 is larger than the width W of the discharge region 6. When the pressure of the lasing medium is 2 Kg/cm$^2$, the height-to-width (H/W) ratio of the discharge region 6 is substantially 2 as illustrated in FIG. 2(a). The discharge region is divided into two half heights discharge regions 6a and 6b, each having $H_1 = \frac{1}{2} H$ height, and the optical axes 7 and 7' are set in the respective central portions of the two divided discharge regiones 6a and 6b. A total reflector 11 for the discharge region 6a and an output coupler 10 are provided on a left side wall 2a of the discharge chamber 2 perpendicularly to the respective optical axes 7 and 7'. A folding optical element 9 is provided on a right side wall 2d of the discharge chamber 2. An optical resonator in the embodiment is composed of the output coupler 10, total reflector 11 and the folding optical element 9.

The folding optical element 9 consists of a total reflector 91 which is perpendicular to the axes 7 and 7' and an optical member having two transparent plane 92 which is positioned in the respective optical axes 7 and 7' with a Brewster angle, and made to be minimum in a surface reflecting rate to P-polarization.

In the above-mentioned embodiment of the present invention, a path from the total reflector 11 to the output coupler 10 via the folding optical element 9 becomes an actual length of the discharge region, and the length of the discharge region becomes twice the optical axis length of the discharge chamber 2. Consequently, the whole cross sectional area which is perpendicular to the axes 7 and 7' of the discharge region 6 effectively serves to generate the laser light, and the laser beam is output from the output coupler 10 via the discharge region 6b which is a lower half of the discharge region 6. A ratio ($H_1/W_1$) of height $H_1$ to width $W_1$ of the discharge region as shown in FIG. 2(a) can be made almost 1, in case that the discharge electrode has a structure of a large H/W ratio for the low atmospheric pressure gas. As a result, the diameter of the external optical system is sufficient to be a diagonal line of the cross section of the discharge region 6b.

Furthermore in the embodiment of the present invention, the output laser light is made to be a vertical polarizing oscillation (P polarization) by an effect of the folding optical element 9. Therefore, when the output laser light is divided by an optical system which is incident with a predetermined angle, stable division is realized, and the feature is one of the advantages of the present invention.

Figure 4:
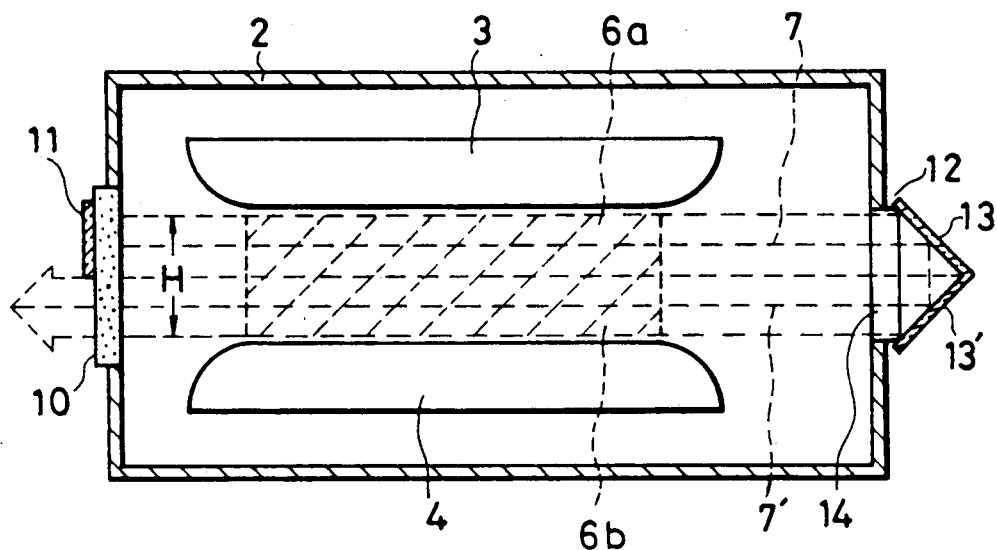
FIG. 4 is a cross-sectional view of a laser apparatus of a second embodiment in accordance with the present invention.

FIG. 4 is a cross-sectional view along the optical axis of a second embodiment of the present invention. In FIG. 4, elements similar to the elements of FIG. 2(b) are identified by like numerals. In the embodiment, only a folding optical element 12 is different from that of the first embodiment.

The folding optical element 12 is composed of two reflectors 13 and 13' which are mounted in the respective optical axes 7 and 7' at 46° and a transparent optical member having a transparent plane 14 which is perpendicular to the axes 7 and 7'.

In the embodiment, since the transparent plane 14 is perpendicular to the optical axes 7 and 7', and the folding optical elements 12 are mounted in the respective optical axes 7 and 7' at 45° (not the Brewster angle), laser light which is reflected by the folding optical element 12 does not deviate from the optical axes 7 and 7' of the incident light in various wavelengthes of the laser. Thus, reflectance of the reflectors 13 and 13' has a wide band covering the wavelength range of the excimer laser, for example, a laser light from XeCl laser (308 nm) to ArF (193 nm) can be oscillated by only changing the laser medium. Other effects of the second embodiment are identical with that of the first embodiment.

Figure 5:
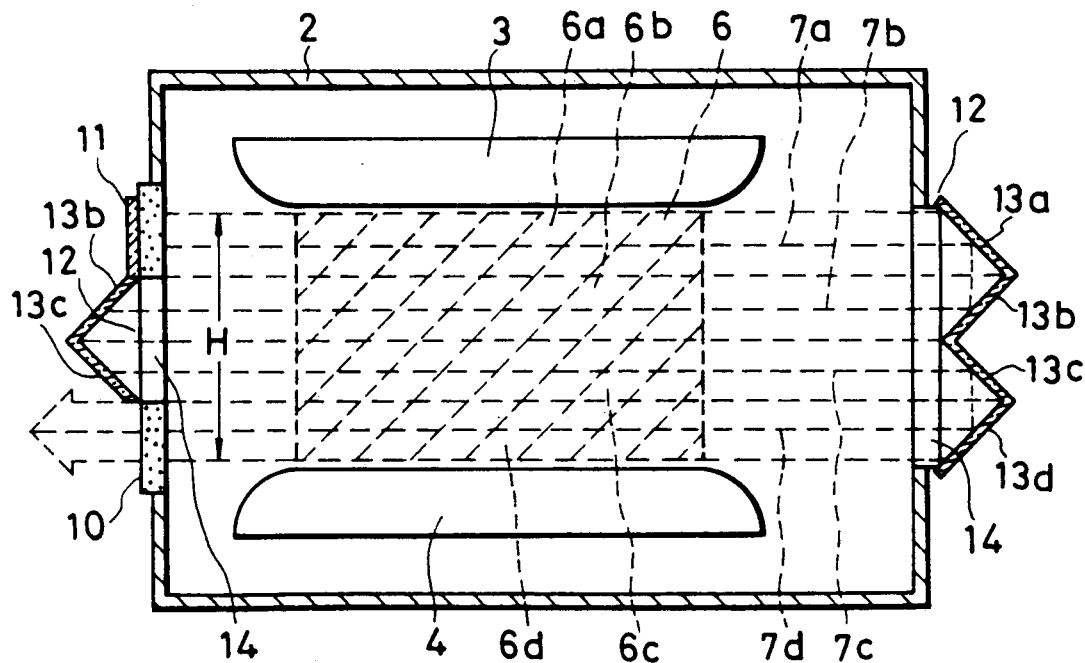
FIG. 5 is a cross-sectional view of a laser apparatus of a third embodiment in accordance with the present invention.

FIG. 5 is a cross-sectional view along the optical axis of a third embodiment of the present invention. In the embodiment, the discharge region 6 is divided into four discharge regions 6a, 6b, 6c and 6d, and the respective optical axes 7a, 7b, 7c and 7d are set in the central portions of the respective discharge regions 6a, 6b, 6c and 6d, respectively. A total reflector 11 which is perpendicular to the optical axis 7a is mounted on a left end portion of the discharge region 6a, and a total reflector 13a is mounted in the optical axis 7a at 45° at a right end of the discharge region 6a. Total reflector 13b is mounted in the optical axis 7b at 45° on both end portions of the discharge region 6b, and total reflector 13c is mounted in the optical axis 7c at 45° on both the end portions of the discharge region 6c. A total reflector 13d is mounted in the optical axis 7d at 45° on the right end portion of the discharge region 6d, and an output coupler 10 which is perpendicular to the optical axis 7d is mounted on the left end portion of the discharge region 6d.

In the discharge chamber 2 of the third embodiment, a length of the total discharge region becomes about four times of the length of the discharge chamber. According to the above-mentioned multi-division discharge region structure, the interval of the main electrodes 3 and 4 can be widened in order to improve efficiency of laser oscillation in low atmospheric pressure of the laser medium. The discharge region 6 which is enlarged in height direction can be divided by using a necessary number of the folding optical element. The folding optical element 9 which is shown in FIG. 2(b) is applicable to the third embodiment.

Figure 6A:
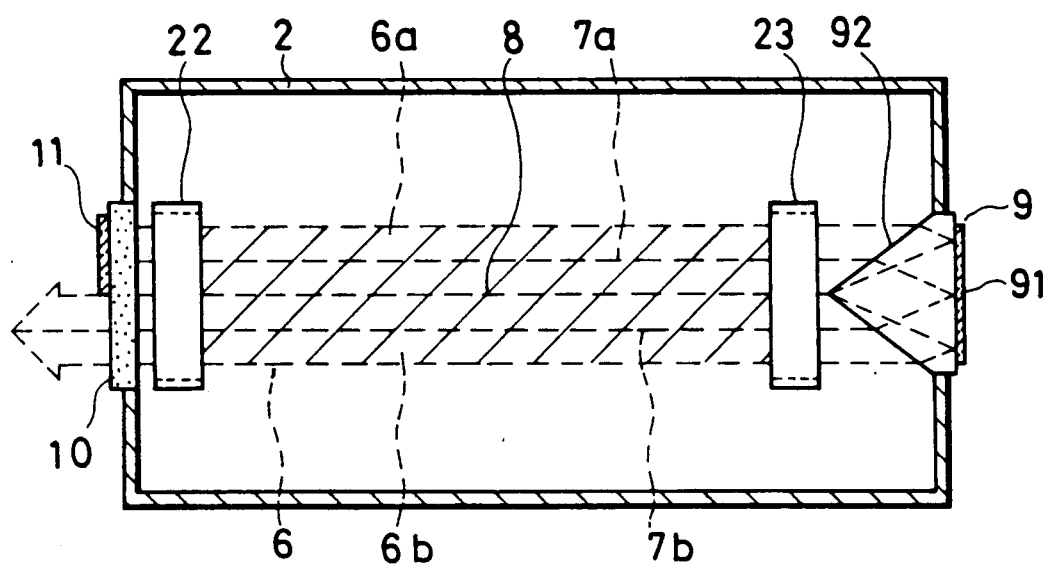
FIG. 6(a) is a cross-sectional view along an axis of a laser apparatus of a fourth embodiment in accordance with the present invention.
Figure 6B:
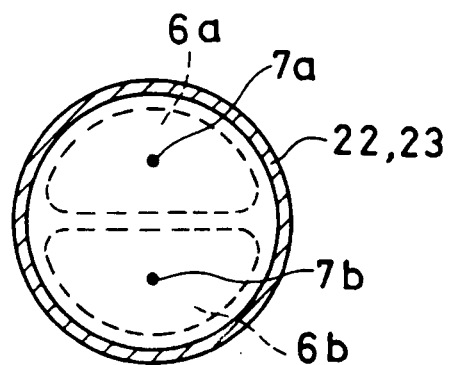
FIG. 6(b) is a cross-sectional view which is perpendicular to the axis of the third embodiment.

FIG. 6(a) is a cross-sectional view of along an optical axis of a fourth embodiment which is applied to a $CO_2$ laser. In the embodiment, a mixed gas of $CO_2$, He, $N_2$ or the like is filled in the discharge chamber 2 as a laser medium. Two short tube-shaped discharge electrodes 22 and 23 are arranged with a predetermined distance in a common optical axis 8 in the discharge chamber 2. A discharge region 6 between the discharge electrodes 22 and 23 is divided into two discharge upper region 6a and lower region 6b, between which the optical axis 8 lies, and optical axes 7a and 7b are in the respective discharge regions 6a and 6b, respectively, as shown in FIG. 6(b). Therein elements similar to the elements of FIG. 2(b) are designated by like numerals. In the embodiment, since a length of an actual discharge region is doubled, a high output $CO_2$ laser is obtainable.

In the high frequency pulse laser apparatus, the laser is oscillated in a low atmospheric pressure of the laser medium. In such apparatus, the gap between the two electrodes is made wider in order to improve efficiency, and the cross section of the discharge region becomes inevitably rectangular. According to the present invention, the discharge region is divided into a predetermined number of smaller discharge regions with the optical axis therebetween. Furthermore, the cross section of the output laser light is formed substantially in a square shape by mounting several reflectors at both end portions of the respective discharge regions, thereby permitting one optical path to work as an optical resonator by means of the reflectors. Consequently, a diameter of the external optical system coupled thereto for receiving the output laser light can be reduced, and cost is saved.

In the above-mentioned embodiment, the output coupler is not essential to be formed integral with the total reflector. Furthermore, the folding optical element can be formed by combination of discrete reflectors. The above-mentioned embodiment of the present invention can be applied to a laser apparatus which is operated in high atmospheric pressure.

Figure 7:
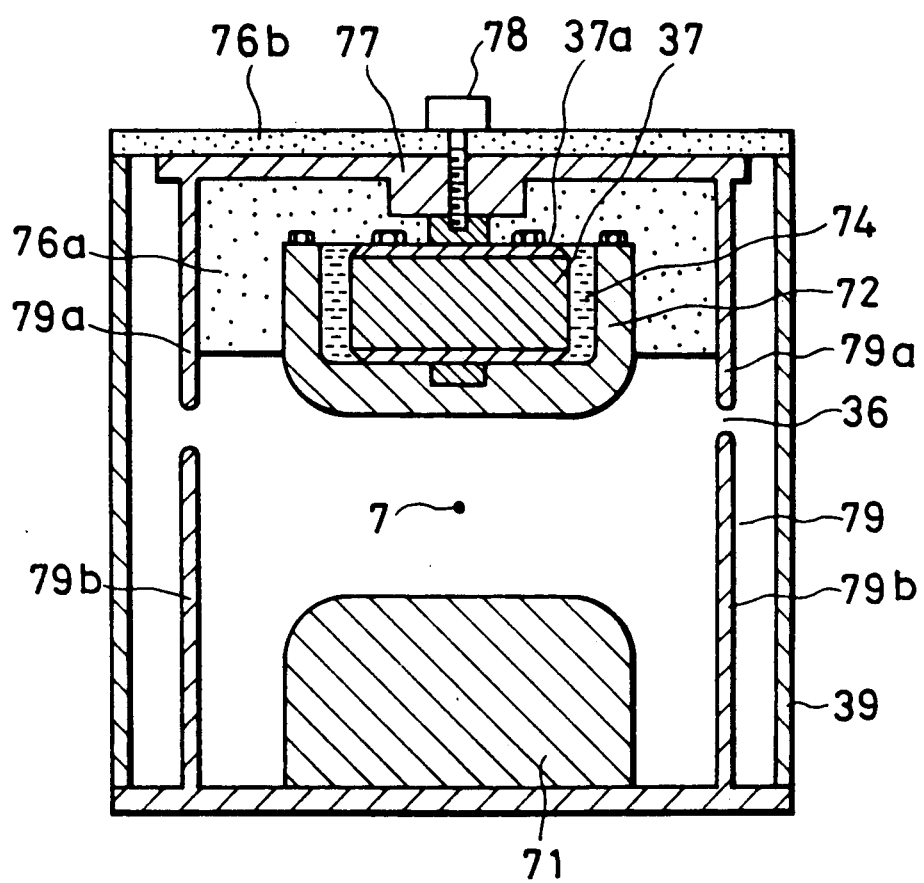
FIG. 7 is a cross-sectional view of a laser apparatus of a fifth embodiment having an electrode containing a capacitor therein in accordance with the present invention.

FIG. 7 is a cross-sectional view at a plane perpendicular to the optical axis, of the discharge chamber showing detailed constitution of the main electrodes and spark gaps serving as pre-discharge device of a fifth embodiment.

Axially oblong electrodes 71 and 72 as main electrodes are provided in a discharge chamber 2, and they are disposed to face each other along an optical axis 7. The electrode 72 has an U-shaped cross section on a perpendicular plane to the optical axis, and a peaking capacitor 37 is mounted in a gutter of square section of the electrode 72. A lower surface of the peaking capacitor 37 is fixed on the gutter, and the upper surface 37a thereof is coupled with high voltage connecting plate 77 by screws 78 penetrating an insulating member 76a. A cooling chamber 74 is formed between side walls of the peaking capacitor 37 and the gutter, and a known coolant is filled therein. A plurality of spark pins 79 arrayed in the axial direction (perpendicular to the paper of FIG. 7) are arranged along both sides of the main electrodes. The upper arrayed spark pins 79a are connected to the high voltage connecting plate 77, and the lower arraied spark pins 79b are connected to the electrode 71. Each upper arrayed spark pin 79a faces a corresponding lower arrayed spark pin (79b), each with predetermined gap. The coolant which is cooled by an external refrigerating apparatus (not shown) is circulated in the cooling chamber 74 along the length of the oblong electrode 72, for example.

In the above-mentioned constitution, a length of an electric current flowing path via the capacitor 37, the arrayed spark pin 79 and the electrodes 71 and 72 is reduced, and a stray inductance 38 as shown in FIG. 3 is reduced. Consequently, electric power which is given to the laser medium between the electrodes 71 and 72 increases, and output of the laser light increases. Since the capacitor 33 is isolated from the laser medium, the capacitor is saved from corrosion. Moreover, deterioration of the laser medium is prevented, too.

Figure 8:
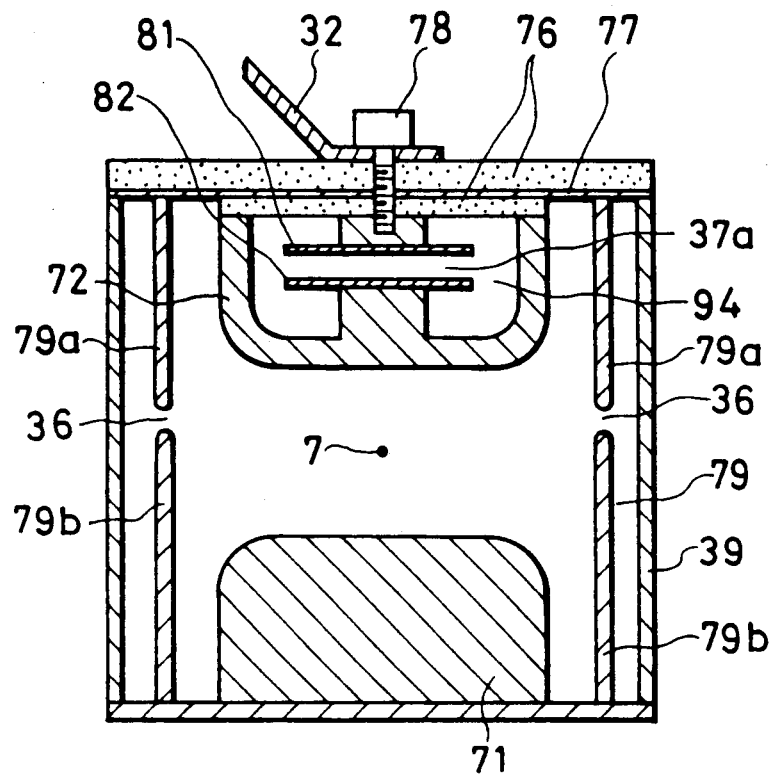
FIG. 8 is a cross-sectional view of a laser apparatus of a sixth embodiment having an electrode containing a capacitor in accordance with the present invention.

FIG. 8 is a cross-sectional view at a plane perpendicular to the optical axis of a sixth embodiment in the main electrodes portion. Referring to FIG. 8, at least two flat board-shaped electrodes 81 and 82 are placed facing each other in a gutter 94 of an upper electrode 72 having an U-shaped perpendicular cross section of the optical axis 7, and thereby a capacitor 37a is formed. The electrode 81 of the capacitor 37a is connected to a high voltage connecting plate 32 by a screw 78. Another electrode 82 is coupled to the outer electrode 72. The gutter 94 is covered by insulating member 76. Non-conductive and high dielectric material such as pure water or oil which is chilled by an external refrigerating apparatus (not shown) is circulared in the gutter 94.

In the embodiment, the dielectric material of the capacitor 37a serves as a coolant, and high power laser apparatus is miniaturized, and reliability of the apparatus is improved.

Figure 9:
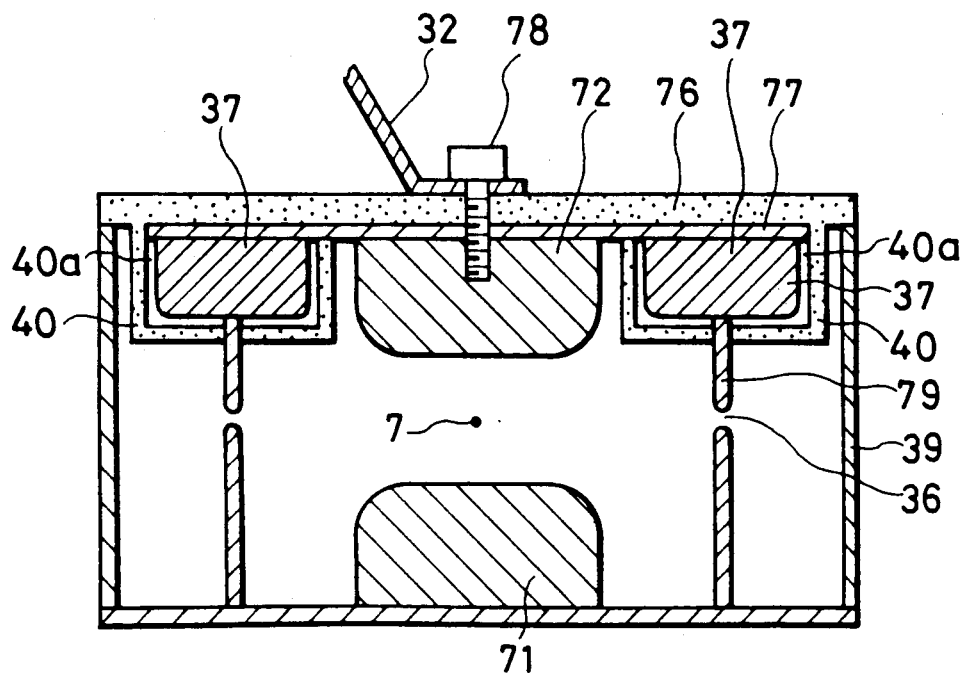
FIG. 9 is a cross-sectional view of a laser apparatus of a seventh embodiment wherein capacitors are mounted in a discharge chamber in accordance with the present invention.

FIG. 9 is a cross-sectional view of a seventh embodiment of a constitution of the main electrodes. In the embodiment, two capacitors 37, 37 are mounted on both sides of the electrode 72. Respective capacitors 37 are covered by non-conductive plates 40 so as to prevent them from directly touching the laser medium, and thereby corrosion of the surfaces of the capacitors 37 by the laser medium can be prevented. Furthermore, the capacitors 37 can be cooled by flowing the coolant in gaps 40a between the capacitors 37 and the non-conductive plates 40. Constitution and operation of the other part of the embodiment are identical with that of the embodiments as shown in FIG. 7 and FIG. 8.

The present invention is most suitable for the excimer laser, but is applicable to other laser apparatus.

What is claimed is:

1. A laser apparatus comprising:
   a discharge chamber enclosing a laser medium therein,
   at least two main electrodes located within said discharge chamber, said electrodes positioned so as to face each other with a main optical axis therebetween and holding an interval therebetween in which a discharge region, having a predetermined height and width, said height being larger than the width of said discharge region, is formed, said discharge region being divided into plural lasing regions in a direction of the height,
   pre-discharge means for preliminarily exciting said laser medium prior to initiation of a main discharge across said main electrodes,
   a total reflector located at one end of said discharge chamber and which faces one portion of said discharge region divided in a direction of said predetermined height, said total reflector having its reflection plane perpendicular to said main optical axis for reflecting a laser light beam by 180°, an output coupler means located at one end of said discharge chamber and which faces another portion of said discharge region divided in the direction of said predetermined height, said output coupler means disposed perpendicularly to said main optical axis and allows laser light to go out therethrough, and at least one light folding means disposed at a second end of said discharge chamber for folding an incident laser light beam in the direction of said predetermined height in a manner so as to direct said beam along a path comprising parallel lasing regions having respective optical axes being parallel to one another and being connected by said light folding means.

2. A laser apparatus in accordance with claim 1, wherein
said laser beam is folded by 180° to travel in parallel with said main optical axis.

3. A laser apparatus in accordance with claim 1, wherein
said light folding means comprises a prism having a reflection plane which is perpendicular to said optical axis and two other planes which substantially makes Brewster angle to said main optical axis.

4. A laser apparatus in accordance with claim 1, wherein
said light folding means comprises two mirrors having reflecting planes which are arranged perpendicularly to each other and are disposed to make 45° to said optical axis.

5. A laser apparatus in accordance with claim 1, wherein
an atmospheric pressure of said laser medium is under three Kg/cm$^2$.

6. A laser apparatus in accordance with claim 1, wherein
said discharge region is divided into three lasing regions dividing said discharge region in the direction of height.

7. A laser apparatus in accordance with claim 1 wherein
said predischarge means comprises a spark gap connected to a peaking capacitor for triggering said main discharge.

8. A laser apparatus in accordance with claim 7, wherein
said capacitor is enclosed in a cavity formed interior of one of at least two main electrodes.

9. A laser apparatus in accordance with claim 7, wherein
said capacitor is enclosed in a cavity formed interior of a wall of said discharge chamber.

10. A laser apparatus in accordance with claim 8, wherein
said capacitor is composed of a pair of flat, plate-shaped electrodes with a dielectric material between said electrodes.

11. A laser apparatus in accordance with claim 10, wherein
said dielectric material is liquid and is circulated in said cavity along the length of said main electrode.

12. A laser apparatus comprising:
a discharge chamber enclosing a laser medium,
at least two main electrodes enclosed in said discharge chamber, said electrodes positioned so as to face each other with a main optical axis therebetween in which a discharge region of a predetermined height and width, said height being larger than said width, is formed,
pre-discharge means for preliminarily exciting said laser medium prior to initiation of a main discharge across said main electrodes,
a total reflector located at one end of said discharge chamber and having its reflection surface perpendicular to said main optical axis for reflecting a laser light beam by 180°,
an output coupler means located at a second end of said discharge chamber and allowing laser light to pass therethrough, said output coupler means disposed so as to be perpendicular to said main optical axis, and
at least one capacitor disposed interiorly of a cavity formed inside at least one of said main electrodes.

13. A laser apparatus in accordance with claim 12, wherein
said at least one capacitor is enclosed in a cavity which is formed along the length of said electrode.

14. A laser apparatus in accordance with claim 12, wherein
a coolant is circulated in said cavity along the length of said main electrode.

15. A laser apparatus in accordance with claim 14, wherein,
said coolant is a dielectric material.

* * * * *